DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED FEBRUARY 3, 1976

943 O.G. 76

T943,009

STABILIZED SPANDEX POLYMERS

Andrew I. Smith, Pensacola, Fla., assignor to Monsanto Company, St. Louis, Mo.

Continuation of abandoned application Ser. No. 424,249, Dec. 12, 1973. This application Sept. 13, 1974, Ser. No. 505,446

Int. Cl. C08k *6/00*

U.S. Cl. 260—45.8 NT

No Drawing. 10 Sheets Specification

Spandex polymer is stabilized by incorporating therein synergistic amounts of a hindered phenol and a benzotriazole having the following formula:

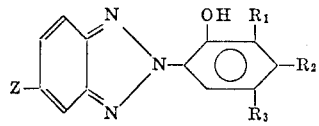

wherein Z is hydrogen or halogen, $R_1$ is hydrogen or C1–C8 alkyl, and $R_2$ is hydrogen or hydroxyl, and $R_3$ is hydrogen or C1–C8 alkyl. Exemplary hindered phenols are:

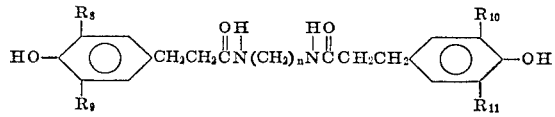

wherein at least $R_8$ and $R_{10}$ are C1–C8 alkyl groups, and $n$ is an integer greater than 0 and less than 15,

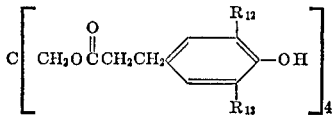

wherein at least $R_{12}$ is a C1–C8 alkyl group, and

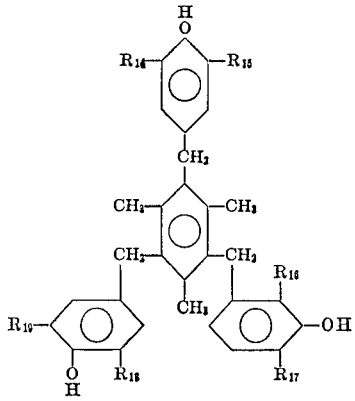

wherein at least $R_{14}$, $R_{16}$ and $R_{18}$ are C1–C8 alkyl groups. $R_9$, $R_{11}$, $R_{13}$, $R_{15}$, $R_{17}$ and $R_{19}$ are preferably also C1–C8 alkyl groups, but may be hydrogen. In all cases, t-butyl is the preferred alkyl group.